T. MASKELL.
Domestic Boiler.
No. 13,526.
Patented Sept. 4, 1855.
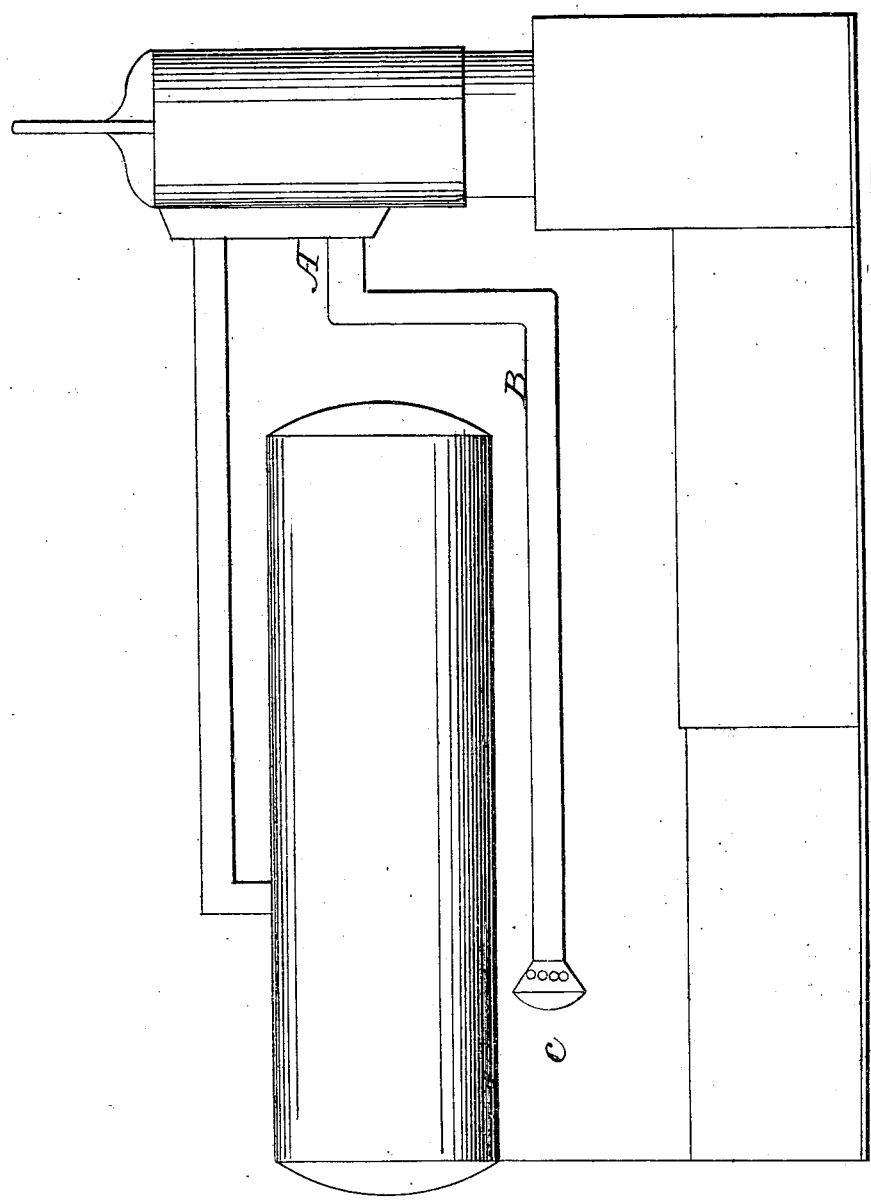

UNITED STATES PATENT OFFICE.

THOMAS MASKELL, OF FRANKLIN, LOUISIANA.

CONSUMING ESCAPE-STEAM AS AN ADJUNCT IN HEATING FURNACES.

Specification of Letters Patent No. 13,526, dated September 4, 1855.

*To all whom it may concern:*

Be it known that I, THOMAS MASKELL, of Franklin, in the State of Louisiana, have invented certain new and useful Improvements in Consuming Escape or Waste Steam and Using it as an Economical Adjunct in Heating the Furnaces of Steam-Engines, &c.; and I do hereby declare that the following is a full, clear, and exact description of the same, reference being had to the accompanying drawings, forming a part of this specification.

The decomposition of water at high temperatures has long been known, but in the application of it in a decomposed condition to useful purposes in the manner I have used it has never before been practically applied.

The value of my discovery will be the more apparent, when it is considered what a waste of fuel results from the latent heat in the exhaust steam of a high pressure engine being permitted to escape into the air after having simply acted on the piston. I therefore propose by my invention to profitably employ this latent heat in addition to the decomposition of the steam itself; and the accomplishment of that object is as follows: To an escape valve A′, of engines as usually constructed, I attach an iron pipe B, of sufficient capacity to allow of the expansion of the escape steam, at least twenty times its volume, this being necessary to prevent explosion. This pipe B, extends through the furnace and terminates in a bulb C, near the center of the fire bed. The bulb C, is perforated with small holes upon the rear portion thereof for the escape of the decomposed steam.

The furnace itself is of the ordinary construction and furnished with the usual grate, &c. The portion of the tube, and the bulb, may be partially filled with iron scraps, lime, &c., for the purpose of assisting in arresting the oxygen, one of the elements of water.

The pipe B, and bulb c, on being surrounded with the flame of fuel upon the grate bar, soon becomes red hot, and a vacuum is formed therein when in this condition, if steam is permitted to pass into the pipe, the high heat and affinity for iron arrests the oxygen of the steam or vaporized water, while the hydrogen passes through the perforations in the bulb c, and greatly increases the intensity of the furnace, and as there is no loss of the heat in the escape steam, it is all returned to the bed of the furnace and thus materially and economically assists in reproduction of steam by the combustion thereof.

From this improvement of mine a vast saving of coal is produced and as the quantity ordinarily used requires great space in steam vessels, the space hitherto devoted to its storage may be used for carrying freight.

I am aware that the introduction of steam into the furnace is not new, but in my improvement by introducing it by a pipe and perforated bulb, delivering it in its decomposed state, at the rear of the bulb where it combines with the carbon of the coal, I have produced a decided improvement over any other mode heretofore known, the advantage of using the bulb, and the placing it above the bed of coal, arising from allowing greater freedom to the decomposed steam to combine with the carbonic oxid eliminated in the combustion of the fuel (a gas requiring oxygen or hydrogen to render its combustion more perfect.) This result could not so perfectly be obtained by the introduction of steam through hollow grate bars as the effect of so doing is to deaden the ignition of the coal on the under side of the bed and to combine with the fuel instead of the gases eliminated therefrom. The perforations of the bulb on the rear side thereof greatly increases the draft of the furnace, serving as a blower thereto.

Claim,—

Having described my invention, what I claim and desire to secure by Letters Patent of the United States is—

The use of escape steam decomposed at a high heat by means of a pipe B, and bolt C, or their equivalent, so placed above the bed of coal as to admit of its combining readily with the gases eliminated therefrom as an economical adjunct in heating boilers, as set forth in the foregoing specification.

In testimony whereof I have hereunto signed my name before two subscribing witnesses.

THOS. MASKELL.

Witnesses:
JOHN F. CLARK,
W. S. CLARK.